(12) United States Patent
Matsumoto et al.

(10) Patent No.: US 6,341,893 B1
(45) Date of Patent: Jan. 29, 2002

(54) PHOTOGRAPHING STAND WITH A RADIATION IMAGE RECEIVING PORTION

(75) Inventors: Kazuhiro Matsumoto, Utsunomiya; Junichi Yamayoshi, Urawa; Osamu Tsujii; Tsukasa Sako, both of Utsunomiya, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/356,699

(22) Filed: Jul. 20, 1999

(30) Foreign Application Priority Data

Jul. 23, 1998 (JP) .......................... 10-223636
Mar. 25, 1999 (JP) .......................... 11-082498

(51) Int. Cl.[7] ................................ A61B 6/04
(52) U.S. Cl. .................. 378/209; 378/195; 378/196; 5/601
(58) Field of Search ................ 378/209, 195, 378/196; 5/601

(56) References Cited

U.S. PATENT DOCUMENTS

| 3,397,411 | A | * | 8/1968 | Rossi | |
|---|---|---|---|---|---|
| 4,468,803 | A | | 8/1984 | Ronci | 378/181 |
| 4,760,591 | A | | 7/1988 | Gallop et al. | 378/170 |
| 4,905,266 | A | * | 2/1990 | Kuck et al. | 378/209 |
| 5,014,292 | A | * | 5/1991 | Siczek et al. | 378/195 |
| 5,202,565 | A | * | 4/1993 | Torii | 378/209 |
| 5,537,454 | A | * | 7/1996 | Korver, II | 378/65 |
| 5,764,724 | A | * | 6/1998 | Ohlson | 378/177 |
| 5,825,843 | A | * | 10/1998 | Kobayashi | 378/20 |
| 5,829,076 | A | * | 11/1998 | Csikos et al. | 5/601 |
| 6,027,247 | A | * | 2/2000 | Tachi et al. | 378/196 |
| 6,045,262 | A | * | 4/2000 | Igeta et al. | 378/209 |

\* cited by examiner

*Primary Examiner*—Robert H. Kim
*Assistant Examiner*—Pamela R. Hobden
(74) *Attorney, Agent, or Firm*—Fitzpatrick, Cella, Harper & Scinto

(57) ABSTRACT

A radiographic stand with a radiation image receiving portion includes a lying stand having a top plate on which a subject lies down, a radiation image receiving portion located below the top plate, and a moving mechanism for making the radiation image receiving portion movable in the widthwise direction or the lengthwise direction of the top plate. The moving mechanism also makes the radiation image receiving portion erectable in a vertical direction.

14 Claims, 8 Drawing Sheets

PHOTOGRAPHING STAND WITH A RADIATION IMAGE RECEIVING PORTION

BACKGROUND OF THE INVENTION

1. Field of the Invention

This invention relates to a photographing stand with a radiation image receiving portion for projecting radiation such as X-ray onto a subject lying down on the top plate of a lying stand such as a table or a bed, and photographing the radiation transmitted through the subject by a radiation image receiving portion disposed below or sideways of the top plate.

2. Related Background Art

A radiation photographing apparatus has heretofore been used in various fields such as the medical diagnosis of subjects and the non-destruction inspection of substances, and a so-called radiation photographing method using an intensifying screen and radiation photographic film brought into close contact with each other is adopted in the apparatus of this kind. In this apparatus, when radiation transmitted through an object enters the intensifying screen, a fluorescent material included in the intensifying screen absorbs the energy of the radiation and creates fluorescence, and the radiation photographic film is sensitized by this fluorescence and records a radiation image as a visible image.

In recent years, there has been devised an image recording-reproducing apparatus provided with a radiation detector comprising an accumulative fluorescent material. In this apparatus, when radiation transmitted through an object enters the accumulative fluorescent material, the accumulative fluorescent material accumulates part of radiation energy therein. When a light such as visible light is applied to the accumulative fluorescent material, the accumulative fluorescent material exhibits accelerated phosphorescence emission conforming to the energy accumulated therein. That is, the accumulative fluorescent material accumulates the radiation image information of the object therein, and scanning means scans the accumulative fluorescent material by excited light such as a laser beam, and reading means photoelectrically reads the accelerated phosphorescence emitted light, and an image signal read by the reading means is recorded or displayed as a visible image by a recording material such as a photosensitive material or display means such as a CRT.

Also, a radiation detector for directly digitally outputting radiation at real time has been proposed by the advance of the semiconductor process technique, and is described, for example, in Japanese Laid-Open Patent Application No. 8-116044. The radiation detector is constructed of a scintillator and a solid state photodetector stacked one upon the other, and the scintillator is adapted to convert radiation into visible light, and the solid state photodetector is adapted to photoelectrically convert the visible light. The solid state photodetector can be made by arranging solid state photodetector elements comprising transparent electrically conductive film and electrically conductive film in a matrix-like form on a substrate comprising quartz glass with amorphous semiconductor film interposed therebetween. Such a radiation detector is in the form of a flat panel having a thickness of several millimeters and therefore, a radiation image receiving portion using the radiation detector can be easily made thin and light in weight.

FIGS. 1A and 1B of the accompanying drawings show a prior-art photographing stand with a radiation image receiving portion having a radiation image receiving portion 1 containing a radiation detector therein and provided on a table 2, and the table 2 is of a construction in which a top plate 5 is supported on a supporting stand 3 through struts 4. The radiation image receiving portion 1 is supported on the upper portion of the supporting stand 3 through a rail stand 6 for movement in the axial direction of the top plate 5. A signal reading circuit, together with the radiation detector, is contained in the radiation image receiving portion 1, and the signal reading circuit is connected to an image processing portion, not shown, through a cable 7.

The photographing stand of this kind is provided with the radiation image receiving portion 1 using a radiation detector and therefore, the work of mounting and dismounting a cassette containing radiation photographic film or accumulative fluorescent material sheets therein, as in the prior art, or developing the radiation photographic film, or scanning a laser beam on the accumulative fluorescent material sheet becomes unnecessary, and the photographer can be liberated from a series of cumbersome work of this kind. That is, the photographer can move the radiation image receiving portion 1 to a desired position relative to a subject S lying down on the top plate 5 and photograph the desired region of the subject S, and can utilize a radiation image displayed by display means such as a CRT for diagnosis.

FIGS. 1C and 1D of the accompanying drawings show a prior-art photographing stand with a radiation image receiving portion using a cassette 1' containing radiation photographic film on accumulative fluorescent material sheets therein together with a table 2' which is comprised of a supporting stand 3, struts 4 and a top plate 5. When the side of a subject S is to be photographed by this photographing stand, it is necessary to vertically hold the cassette 1' on the top plate 5 by a special supporting tool or the hand of the subject S, and when the side of the subject S is to be photographed on the bed of an ICU (intensive care unit), it is necessary for the photographer to vertically hold the cassette 1'.

Also, when the subject S lying down on the bed of the ICU has, for example, heart trouble, a great burden is applied to his or her heart when the subject S gets up. Therefore, the bed of the prior-art ICU is often provided with a tiltable movable top plate on at least one axial end portion of the top plate. When this bed is used, it is necessary to dispose the cassette 1' behind the movable top plate after the latter is erected and moreover, it is necessary to photograph the lower half of the body of the subject S with the upper half of the body of the subject S erected.

Thus, to make the effectiveness of the tables 2, 2' and the bed sufficiently displayed, it is necessary to hold the radiation image receiving portion 1 or the cassette 1' in a posture which can be photographed from a plurality of different directions. However, to dispose the radiation image receiving portion 1 at a desired position, the following problems arise.

(a) The radiation image receiving portion 1 and the image processing portion are connected together by a cable 7 and moreover, the radiation image receiving portion 1 is heavier and larger than the cassette 1' and therefore, it becomes necessary for the photographer to do the cumbersome work of taking out the radiation image receiving portion 1 from the underside of the top plate 5 and vertically standing it on the top plate 5 before photographing, and returning it from above the top plate 5 to below the top plate 5 after photographing.

(b) The radiation detector which is the main constituent of the radiation image receiving portion 1 is expensive and therefore, it becomes costly to individually prepare the radiation image receiving portion 1 in order to cope with different photographing, or to incorporate it into the bed of the ICU.

(c) The top plate of the bed of the ICU is not of a uniformly flat shape and therefore, to continuously move the radiation image receiving portion 1 along the top plate as by an operator's hand, an excess space for movement becomes necessary in the under portion of the top plate.

(d) As a problem discrete from these problems, when a grid is used for the radiation image receiving portion 1 and side photographing is to be effected with the grid made stationary, moire attributable to the relation between the pixel pitch of the radiation detector and the arrangement pitch of the lead foil of the grid occurs on the radiation image.

(e) It is necessary to avoid to the utmost forcibly moving an emergency patient or a patient in a critical condition lying down on the bed of the ICU to the top plate 5 of the table 2 and therefore, to photograph the patient lying down on the bed of the ICU, it is also necessary to dispose the radiation image receiving portion 1 on the bed of the ICU.

SUMMARY OF THE INVENTION

It is an object of the present invention to solve some or all of the above-noted problems and to provide an inexpensive photographing stand with a radiation image receiving portion which can easily photograph from a plurality of different directions.

Other objects of the present invention will become apparent from the following detailed description of some embodiments of the invention.

DESCRIPTION OF THE PREFERRED EMBODIMENTS

The present invention will hereinafter be described with respect to some embodiments thereof shown in FIGS. 2A, 2B and 3 to 11.

Figure 1A:
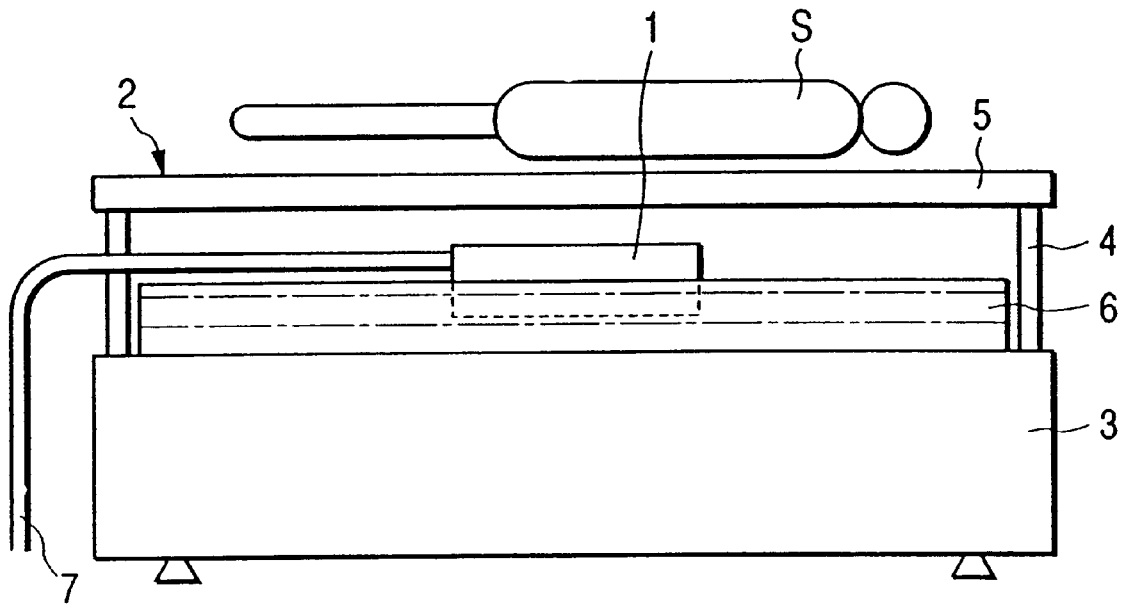
FIG. 1A is a side view of an example of the prior art.
Figure 1B:
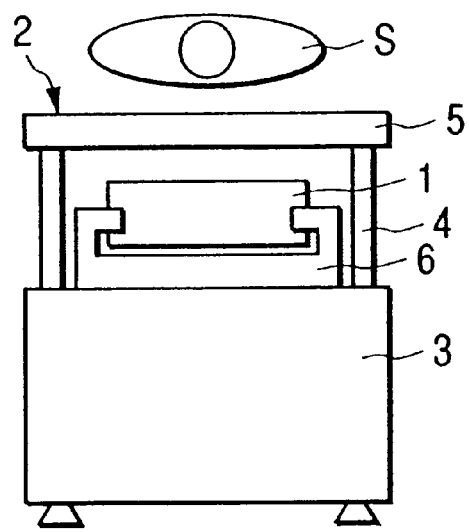
FIG. 1B is a front view of an example of the prior art.
Figure 1C:
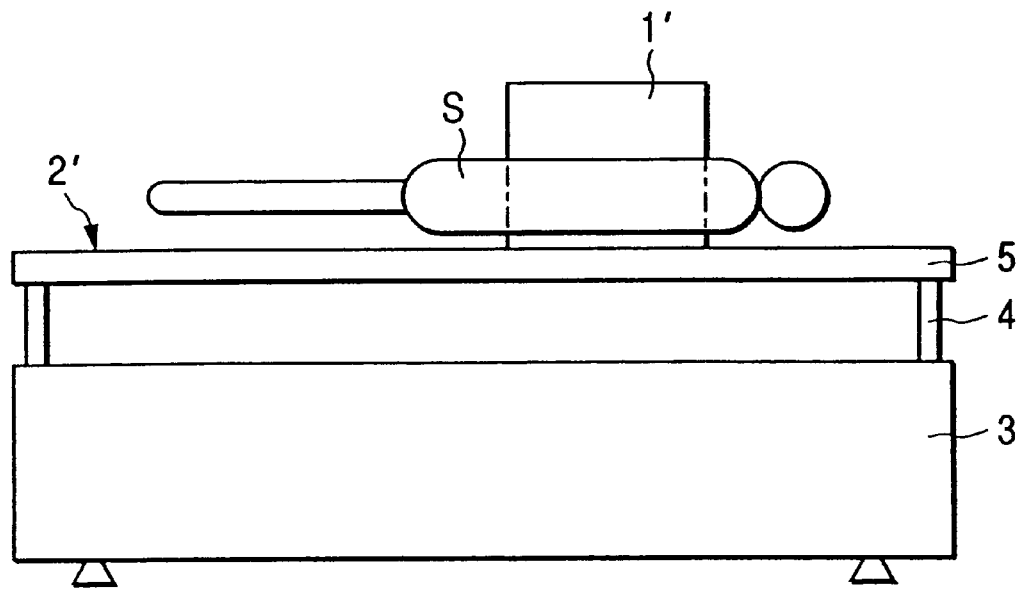
FIG. 1C is a side view of another example of the prior art.
Figure 1D:
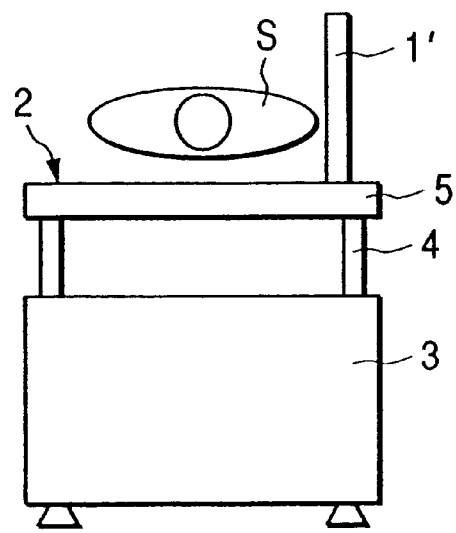
FIG. 1D is a front view of another example of the prior art.
Figure 2A:
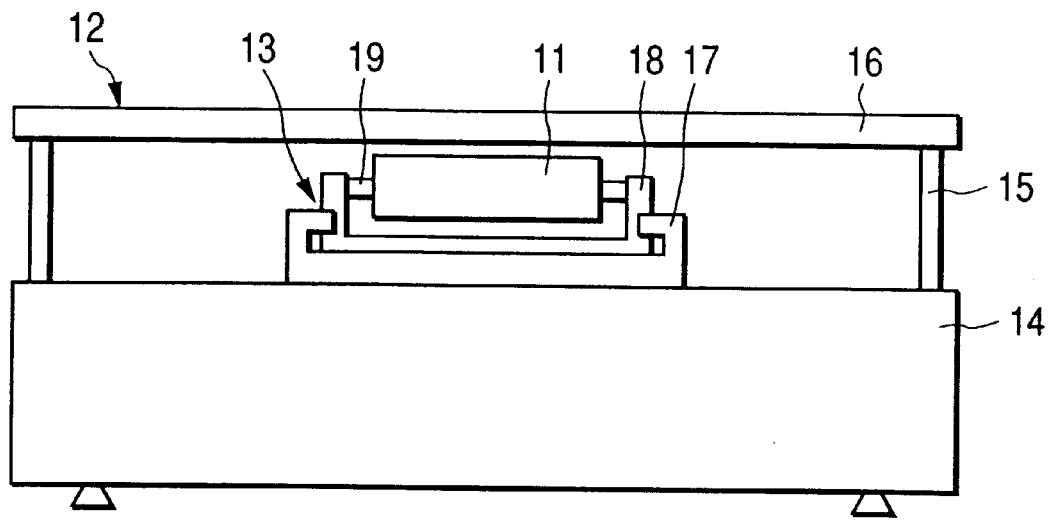
FIG. 2A is a side view of a first embodiment of the present invention.
Figure 2B:
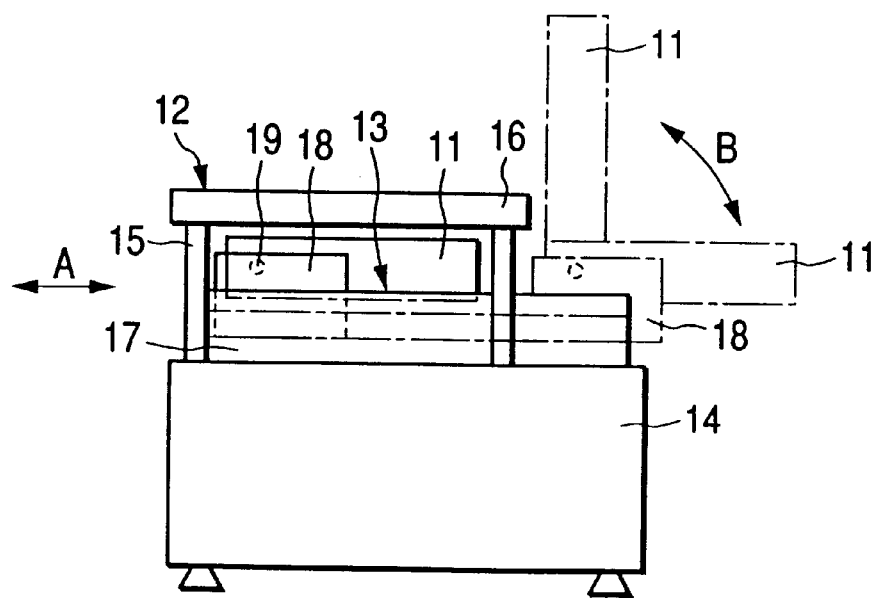
FIG. 2B is a front view of the first embodiment.

FIG. 2A is a side view of a first embodiment, and FIG. 2B is a front view of the second embodiment, and a photographing stand with an X-ray image receiving portion is capable of effecting the simple photographing of a subject's limbs, head, abdomen, etc., and an X-ray image receiving portion 11 for photographing the subject is assembled to a table 12 which is a lying stand on which the subject can lie down, through a moving mechanism 13. The X-ray image receiving portion 11 contains therein an X-ray detector and a signal reading circuit, not shown, and the signal reading circuit is connected to a signal processing portion through a cable, not shown. The table 12 comprises a supporting stand 14 which can be disposed on the floor of a photographing room or the like, and a top plate 16 horizontally supported above the supporting stand 14 through struts 15 at the four corners, and the top plate 16 is formed by an acrylic plate, a carbon plate or the like.

In the moving mechanism 13, a fixed rail stand 17 is fixed to substantially the center of the supporting stand 14 in the lengthwise direction thereof toward the lengthwise direction of the top plate 16. A movable stand 18 is assembled to the fixed rail stand 17 for movement in the direction of arrow A which is the widthwise direction of the top plate 16. A support shaft 19 is supported on one end of the movable stand 18 toward the lengthwise direction of the top plate 16, and the opposite surfaces of one end of the X-ray image receiving portion 11 are supported on this support shaft 19. Also, a bearing member such as an anti-friction bearing or a slide bearing, not shown, is interposed between the X-ray image receiving portion 11 and the support shaft 19, and the X-ray image receiving portion 11 is rotatable by 90° in the direction of arrow B between a horizontal position and a vertical position.

When the front or back of the subject is to be photographed, the photographer makes the X-ray image receiving portion 11 horizontal and pushes the movable stand 18 into under the top plate 16. The subject is then made to lie down on the top plate 16 and X-rays are projected from above the top plate 16, and the subject is photographed by the X-ray image receiving portion 11 located under the top plate 16.

Also, when a side of the subject is to be photographed, the photographer pushes the movable stand 18 in the direction of arrow A and exposes the X-ray image receiving portion 11 from the lower portion of the top plate 16 as indicated by broken lines. Next, the X-ray image receiving portion 11 is rotated in the direction of arrow B about the support shaft 19 and is erected vertically. X-rays are then projected from the sideways of the subject and the subject is photographed by the X-ray image receiving portion 11 erected sideways of the top plate 16.

As described above, in the first embodiment, the photographer can guide the X-ray image receiving portion 11 to any desired position and change it to any desired posture without detaching the X-ray image receiving portion 11 from the table 12 and can therefore easily photograph the subject from a plurality of different directions. Also, the X-ray image receiving portion 11 is stepwisely moved, that is, is horizontally moved and thereafter is erected vertically, or is horizontally brought down and thereafter is moved horizontally and therefore, the space between the supporting stand 14 and the top plate 16 can be narrowed and the whole device does not become bulky. Also, if provision is made for a moving mechanism, not shown, for moving the moving mechanism 13 in the lengthwise direction of the top plate 16, the entire side of the subject can be photographed easily.

Figure 3:
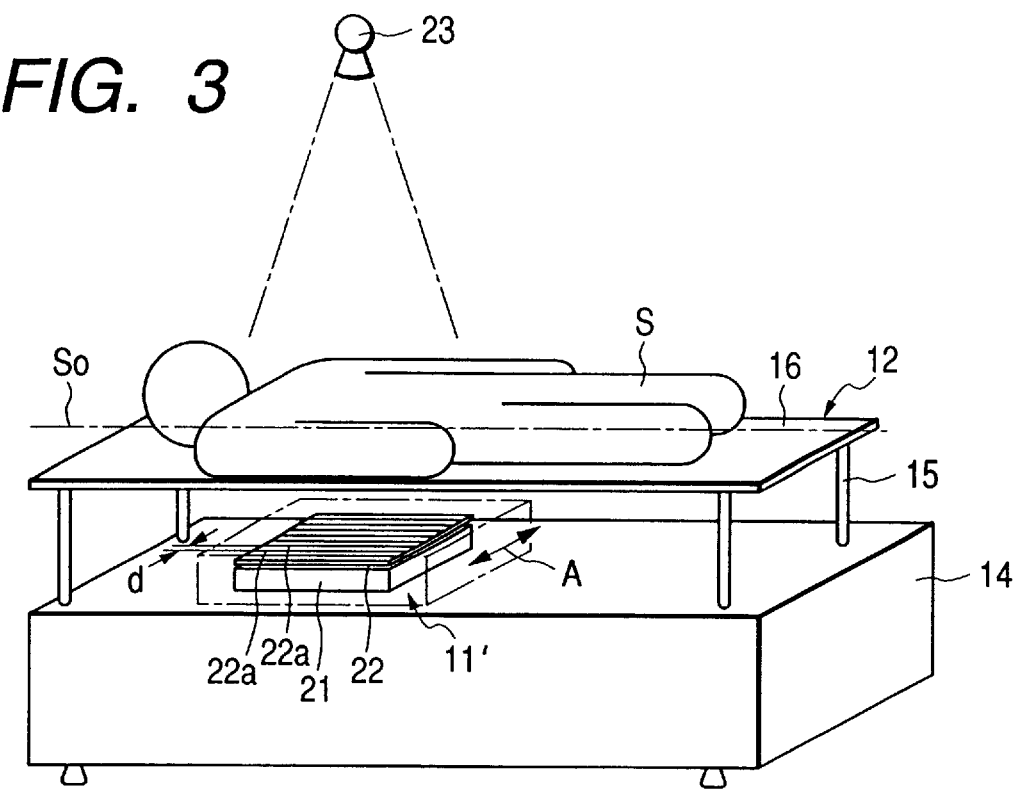
FIG. 3 is a perspective view illustrating the use of a grid.

FIG. 3 is a perspective view illustrating the use of a grid for preventing the scattering of X-rays, and in FIG. 3, the same reference numerals as those in FIGS. 2A and 2B designate the same members. An X-ray image receiving portion 11' has an X-ray detector 21 and a grid 22 incorporated therein, and a vessel 23 emitting X-rays is movably provided above the top plate 16. The grid 22 comprises a plurality of strips of lead foil 22a arranged parallel to one another at predetermined equal intervals d, and the direction of arrangement of the lead foil 22a is made coincident with the widthwise direction of the top plate 16. The lengthwise direction of the lead foil 22a and the body axis $S_0$ of a subject S are made coincident with each other and a positional relation preferable to a clinical image is maintained.

X-rays having entered the subject S from the vessel 23 are transmitted through the top plate 16 and thereafter enter the grid 22, and arrive at an X-ray detector 21 with their scattered rays removed. When at this time, the grid 22 is moved in the lengthwise direction of the top plate 16, the positions of the lead foil 22a relative to the widthwise direction of the top plate 16 do not change and therefore, the lead foil 22a appears in the image. Therefore, it is necessary to move (e.g. pivotally move) the grid 22 in the direction of arrow A which is the widthwise direction of the top plate 16 in FIG. 3 in the X-ray image receiving portion 11' by driving means, not shown.

Figure 4:
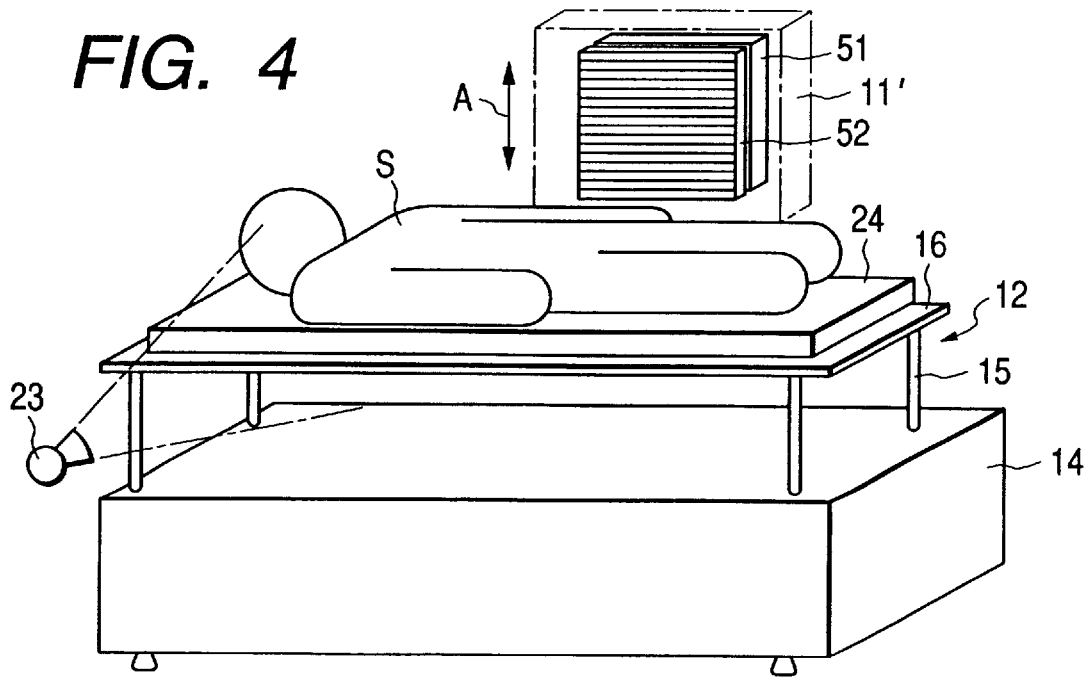
FIG. 4 is a perspective view illustrating the use of the grid.

When as shown in FIG. 4, the X-ray image receiving portion 11' is in a position for photographing a side of the subject S, the lengthwise direction of the lead foil 22a and the body axis $S_0$ of the subject S coincide with each other and the X-ray image receiving portion 11' maintains its preferable state. Also, when a side of the whole body of the subject S is to be photographed, the vessel 23 and the X-ray image receiving portion 11' are moved at the same time. The grid 22 is held in a vertical position with respect to the lengthwise direction of the top plate 16 and they are moved at the same time along the lengthwise direction of the lead foil 22a, i.e., the lengthwise direction of the top plate 16, but the vessel 23 need not be accurately held in the vertical position relative to the X-ray image receiving portion 11' and therefore, the photographing work becomes easy.

Also, when the position of the X-ray image receiving portion 11' in the vertical direction is to be adjusted relative to the subject S, a spacer 24 of a predetermined thickness can be interposed between the top plate 16 and the subject S or provision can be made of a moving mechanism, not shown, for moving the X-ray image receiving portion 11' in the vertical direction. This adjusting work can be done before photographing and therefore, photographing can be done continuously.

Figure 5:
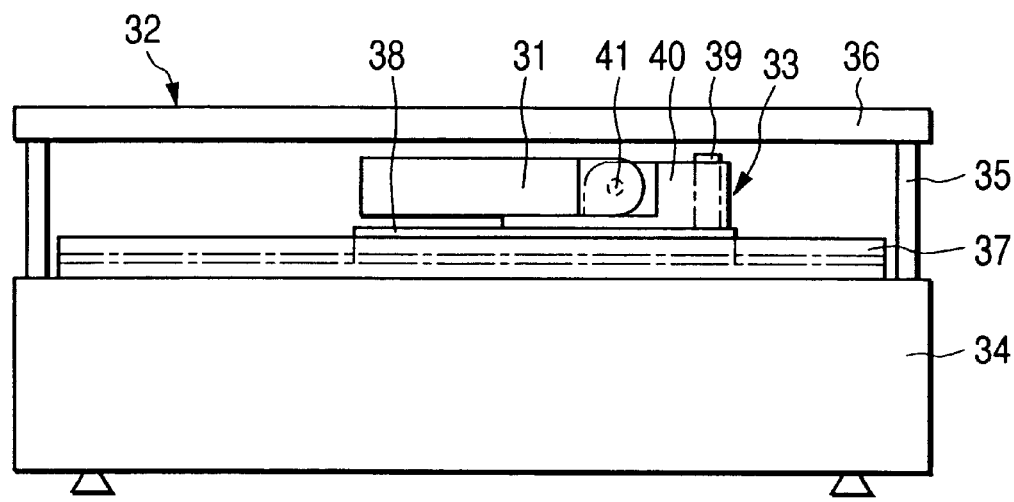
FIG. 5 is a side view of a second embodiment of the present invention.
Figure 6:
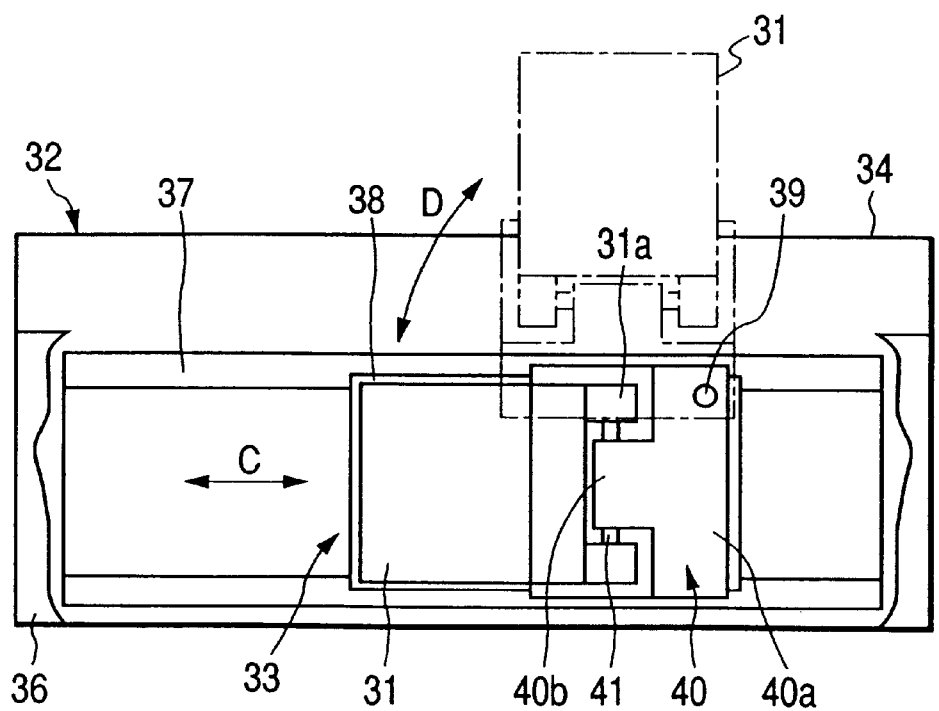
FIG. 6 is a partly cut-away plan view of the second embodiment.
Figure 7:
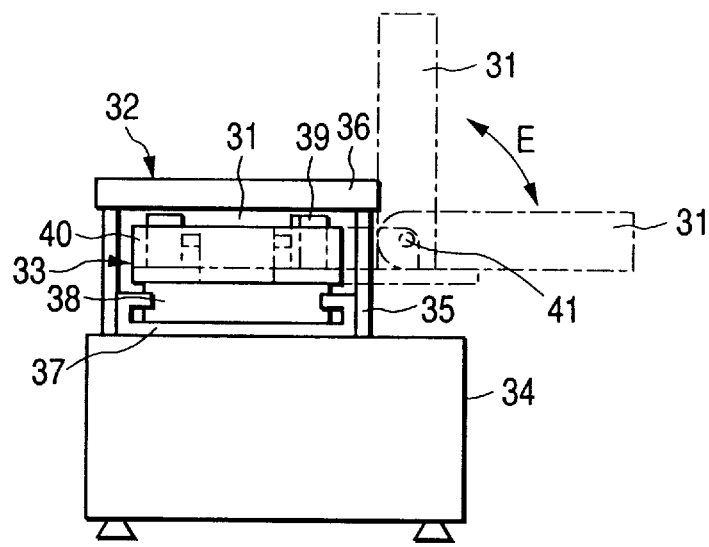
FIG. 7 is a front view of the second embodiment.

FIG. 5 is a side view of a second embodiment of the present invention, FIG. 6 is a partly cut-away plan view thereof, and FIG. 7 is a front view thereof, and an X-ray image receiving portion 31 is supported on a table 32 through a moving mechanism 33. The X-ray image receiving portion 31 and the table 32 are similar to those in the first embodiment, and in the table 32, a top plate 36 is supported on a supporting stand 34 through struts 35.

In the moving mechanism 33, a fixed rail stand 37 is fixed to the upper surface of the supporting stand 34 toward the lengthwise direction of the top plate 36, and a movable stand 38 is incorporated in the fixed rail stand 37 for movement in the direction of arrow C. A support shaft 39 is uprightly provided on the upper surface of one end portion of the movable stand 38, and a rotatable stand 40 is mounted on this support shaft 39 for rotation in the direction of arrow D. The rotatable stand 40 is of a flat T-shape, and the support shaft 39 is fitted in a hole in one end portion of the laterally long portion 40a of the T-shape of the rotatable stand 40. On the vertically long portion 40b of the T-shape of the rotatable stand 40, a support shaft 41 is provided parallel to the laterally long portion 40a, and the opposite end portions of the support shaft 41 are fitted in holes in the protruded portions 31a on the opposite sides of the X-ray image receiving portion 31, and the X-ray image receiving portion 31 is rotatable in the direction of arrow E of a horizontal position and a vertical position.

When the front or back of the subject is to be photographed, the photographer positions the X-ray image receiving portion 31 below the top plate 36. On the other hand, during the photographing of a side of the subject, the photographer rotates the X-ray image receiving portion 31 by 90° in the widthwise direction of the rotatable stand 40 and the top plate 36 to thereby expose the X-ray image receiving portion 31 from the lower portion of the top plate 36. Next, the X-ray image receiving portion 31 is vertically erected by 90°. The side of the whole body of the subject is photographed while the erected X-ray image receiving portion 31 is moved in the lengthwise direction of the top plate 36 with the movable stand 38. This second embodiment can achieve an effect similar to that of the first embodiment and moreover can photograph the entire side of the subject.

Figure 8:
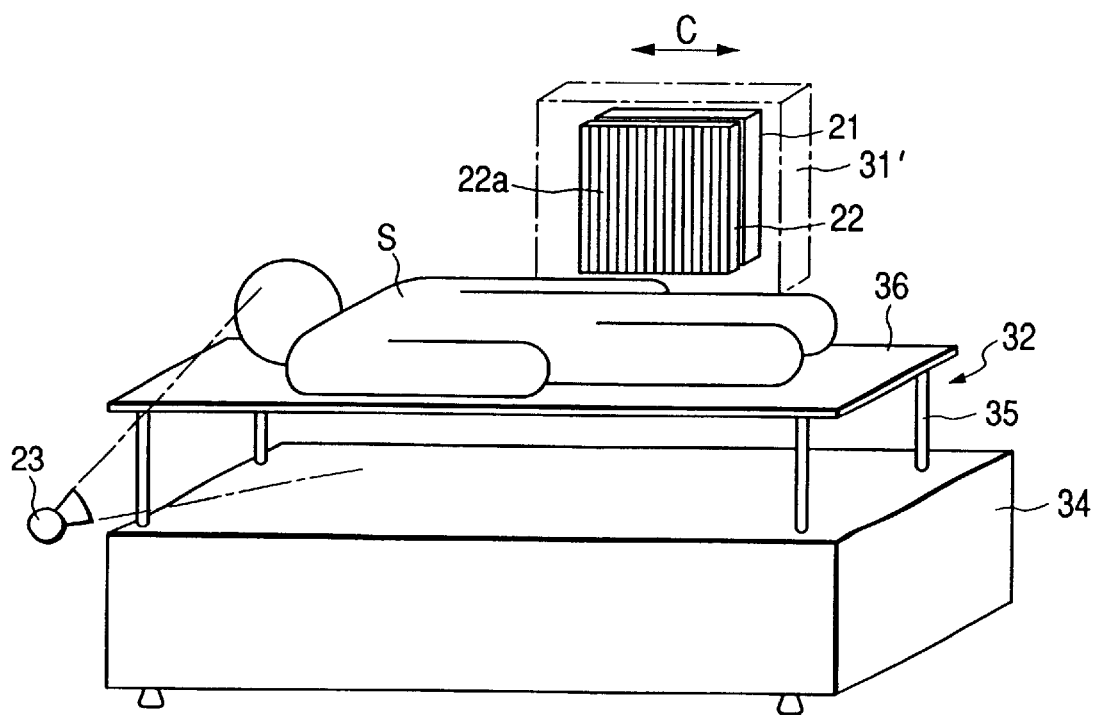
FIG. 8 is a perspective view illustrating the use of a grid.

FIG. 8 is a perspective view illustrating the use of a grid for preventing the scattering of X-rays, and an X-ray image receiving portion 31' contains therein an X-ray detector 21 and a grid 22 similar to those in the first embodiment. When the X-ray image receiving portion 31' is in a position for photographing a side of the subject S, the lengthwise direction of the lead foil 22a of the grid 22 differs by 90° from the direction of arrow C which is the direction of movement of the grid 22.

Accordingly, it is preferable to move (e.g. pivotally move) the grid 22 in the lengthwise direction of the top plate 36. Here, it is not necessary to strictly effect the alignment of the X-ray image receiving portion 31' in the vertical direction relative to the subject S. In contrast, it is necessary to relatively accurately effect the alignment of the vessel 23 and the X-ray image receiving portion 31' with respect to the lengthwise direction of the top plate 36. Therefore, in order to change the portion to be photographed, the top plate 36 can be moved in the lengthwise direction instead of the X-ray image receiving portion 31' being moved in the lengthwise direction of the top plate 36. In this case, the photographing work becomes easy.

In the above-described first and second embodiments, the posture of the X-ray image receiving portions 11, 31 has been shown as being substantially vertically changed, whereas this is not restrictive, but if the posture of the X-ray image receiving portions 11, 31 is changed to an inclined angle which is not a right angle with respect to the top plates 16, 36, the subject S can be photographed from an oblique direction without the posture of the subject S being inclined with respect to the top plates 16, 36.

Figure 9:
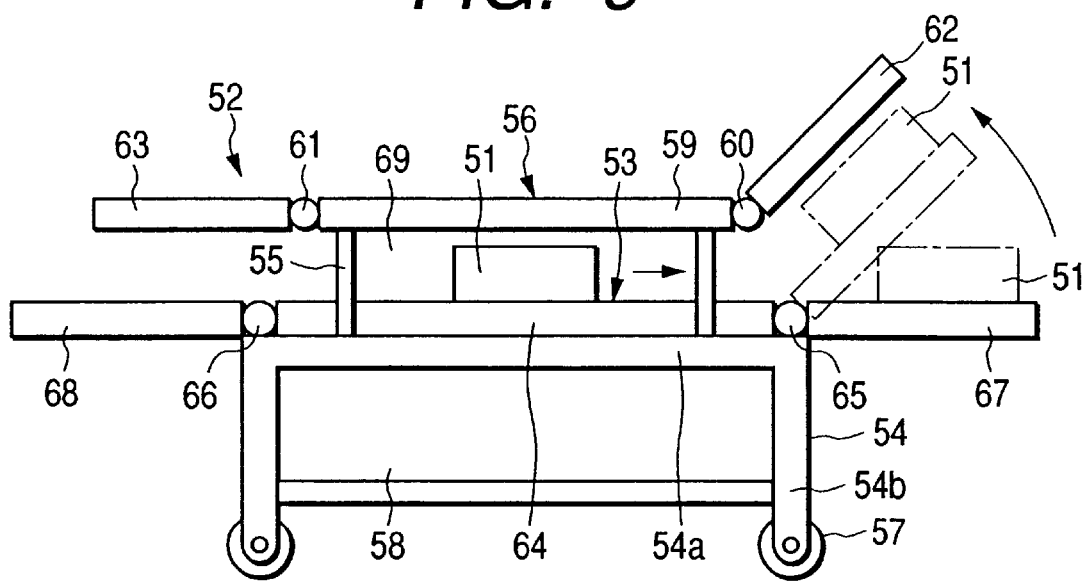
FIG. 9 is a side view of a third embodiment of the present invention.

Referring now to FIG. 9 which is a side view of a third embodiment of the present invention, a radiation image receiving portion 51 is movably supported on the bed 52 of an ICU through a moving mechanism 53. A top plate 56 is supported on the horizontal portion 54a of the supporting stand 54 of the bed 52 through struts 45, and casters 57 are provided on the lower ends of the legs 54b of the supporting stand 54, whereby the bed 52 is movable. An auxiliary breathing appliance such as an oxygen cylinder and a measuring appliance such as an electrocardiograph can be carried in a space 58 surrounded by the legs 54b of the supporting stand 54.

The top plate 56 is comprised of a fixed top plate 59 positioned in the central portion in the lengthwise direction thereof, and movable top plates 62, 63 supported on the opposite end portions of the fixed top plate 59 through hinges 60, 61 for rotation in a vertical direction, and the movable top plates 62, 63 can be fixed at any angle. Also, the moving mechanism 53 is comprised of a fixed rail stand 64 positioned in the central portion thereof, and movable rail stands 67, 68 supported on the opposite end portions of the fixed rail stand 64 through hinges 65, 66 for rotation in a vertical direction, and these movable rail stands 67, 68 can also be fixed at any angle.

When the fixed top plate 59 and the movable top plates 62, 63 form horizontal, the fixed rail stand 64 and the movable rail stands 67, 68 also form horizontal, and the radiation image receiving portion 51 becomes movable to below the movable top plates 62, 63.

On the other hand, when the upper half of the subject's body is to be photographed, e.g., the movable top plate 62 on which the upper half of the subject's body is positioned is erected by about 45° in a vertical direction, and as indicated by broken lines, the radiation image receiving portion 51 is moved and fixed onto the movable rail stand 67, which is then rotated and fixed so as to become parallel to the movable top plate 62.

Again in this third embodiment, the photographer can photograph the subject from different directions without detaching the radiation image receiving portion 51 from the bed 52. Also, the radiation image receiving portion 51 is moved only in the lengthwise direction of the top plate 56 and therefore, the space 69 between the supporting stand 54 and the top plate 56 can be narrowed. If in this case, as in the first and second embodiments, the radiation image receiving portion 51 is designed to be moved in the widthwise direction of the top plate 56 and erectile, side photographing will also become possible.

Figure 10:
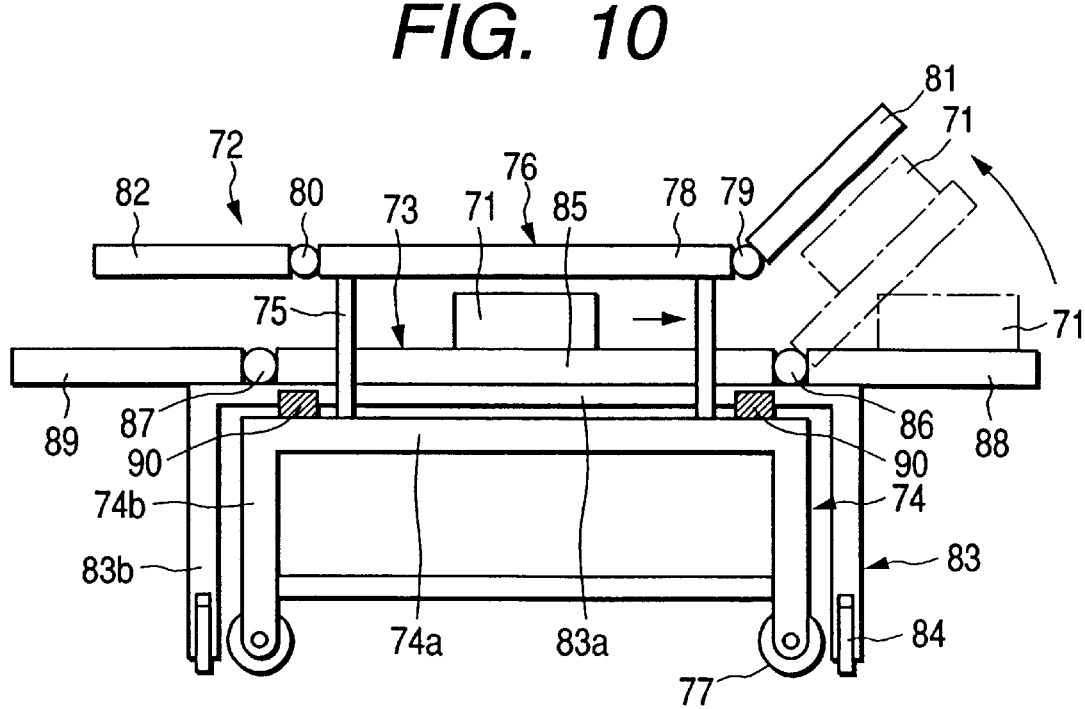
FIG. 10 is a side view of a fourth embodiment of the present invention.
Figure 11:
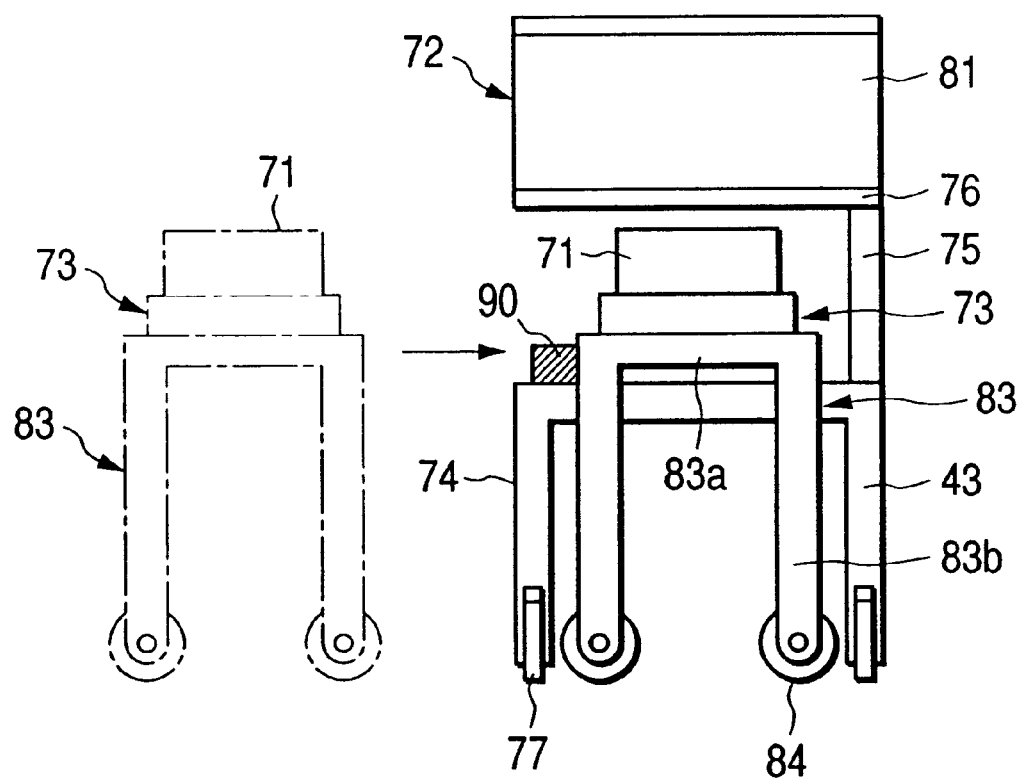
FIG. 11 is a front view of the fourth embodiment.

FIG. 10 is a side view of a fourth embodiment of the present invention, and FIG. 11 is a front view thereof, and provision is made of an X-ray image receiving portion 71, a bed 72 and a moving mechanism 73, and the bed 72 is provided with a supporting stand 74, struts 75, a top plate 76 and casters 77. The top plate 76 is provided with a fixed top plate 78, hinges 79, 80 and movable top plates 81, 82. The top plate 76 has its one side supported by two struts 75.

The X-ray image receiving portion 71 and the moving mechanism 73 are supported on a second supporting stand 83 discrete from the bed 72. The second supporting stand 83 is removably insertable into the bed 72, and is comprised of a horizontal portion 83a located above the horizontal portion 74a of the supporting stand 74 of the bed 72, legs 83b located outwardly of the legs 74b of the supporting stand 74 of the bed 72, and casters 84 mounted on the lower ends of these legs 83b. The moving mechanism 73 is installed on the horizontal portion 83a of the second supporting stand 83, and this moving mechanism 73 is comprised of a fixed rail stand 85, hinges 86, 87 and movable rail stands 88, 89 similar to those in the third embodiment.

In this fourth embodiment, only when the subject lying down on the top plate 76 is to be photographed, the second supporting stand 83 can be moved to thereby locate the X-ray image receiving portion 71 below the top plate 76, and it is not necessary to incorporate the X-ray image receiving portion 71 into the table 72 from the first.

Also, in the present embodiment, when the subject is to be photographed with the grid moved in the X-ray image receiving portion, it is necessary to fix the supporting stands 74 and 83 to each other, for example, by the use of a lock mechanism 90, and prevent their relative position from deviating during the movement of the grid. It is desirable that the fixing by the lock mechanism 90 be done at positions near the lengthwisely opposite ends of the horizontal portion 74a of the supporting stand 74. When the relative position of the supporting stand 74 supporting the subject thereon and the supporting stand 83 supporting the X-ray image receiving portion thereon deviates during photographing, the photographed image may be aggravated.

When photographing is effected without the grid being moved or without the grid being used, fixing means like this lock mechanism need not always be provided.

While in the above-described first to fourth embodiments, use is made of the X-ray image receiving portions 11, 11', 31, 31', 51 and 71 containing an X-ray detector therein, a similar effect in such point as the ease of operation can be achieved even if a cassette containing radiation photographic film or accumulative fluorescent material sheets therein is adopted.

As described above, provision is made of guide means for guiding the radiation image receiving portion in the widthwise or lengthwise direction of the top plate, and erecting means for erecting the radiation image receiving portion in the vertical direction and therefore, the photographer does not require the conventional work of manually carrying the radiation image receiving portion without any guide, but can easily photograph from a plurality of different directions. Also, like the conventional cassette, photographing can be effected from a plurality of different directions by a single radiation image receiving portion and therefore, manufacturing and running costs are reduced.

What is claimed is:

1. A radiographic stand with a radiation image receiving portion comprising:

a lying stand having a top plate on which a subject is supported;

a radiation image receiving portion including a grid which comprises a plurality of stripes of foil arranged in a first direction; and a moving mechanism for making said radiation image receiving portion movable in a horizontal direction, locatable at a position outside from under said top plate in a direction along a shorter side of said top plate, and erectable in a vertical direction when said radiation image receiving portion is located at the outside position, wherein said moving mechanism makes said radiation image receiving portion movable in a horizontal direction between a position under said top plate and the outside position without rotation.

2. A radiographic stand of claim 1, wherein said moving mechanism guides motion of said radiation image receiving portion in both a direction of a shorter side of said top plate and a direction of a longer side of said top plate.

3. A radiographic stand of claim 1, wherein said moving mechanism guides rotation of said radiation image receiving portion for erection of said radiation image receiving portion.

4. A radiographic stand of claim 3, wherein said moving mechanism allows said radiation image receiving portion to be rotated by 90°.

5. A radiographic stand of claim 1, wherein said top plate has at an end thereof a tiltable top plate.

6. A radiographic stand of claim 1, wherein said lying stand includes a supporting stand for supporting said top plate, with said supporting stand provided at an end thereof with a tiltable supporting plate, and said moving mechanism guides said radiation image receiving portion onto said tiltable supporting plate.

7. A radiographic stand of claim 1, further comprising a supporting stand discrete from said lying stand, wherein said supporting stand is provided at an end thereof with a tiltable supporting plate, and said moving mechanism guides said radiation image receiving portion onto said tiltable supporting plate.

8. A radiographic stand of claim 1, wherein said radiation image receiving portion includes a radiation image detector having a plurality of detecting elements for photoelectrically converting radiation, and a signal reading circuit for reading a signal from said radiation image detector.

9. A radiographic stand of claim 1, wherein said radiation image receiving portion includes a grid moving mechanism for moving said grid in a direction perpendicular to a direction of a longer side of said foil of said grid.

10. A radiographic stand of claim 1, wherein a direction of a longer side of said foil of said grid is parallel to a direction of a longer side of said top plate.

11. A radiographic stand of claim 10, wherein said radiation image receiving portion includes a grid moving mechanism for moving said grid in a direction perpendicular to the direction of a longer side of said foil of said grid.

12. A radiographic stand with a radiation image receiving portion comprising:

a lying stand having a top plate on which a subject is supported;

a radiation image receiving portion including a grid comprising a plurality of stripes of foil arranged in a first direction; and a moving mechanism for making said radiation image receiving portion movable in a horizontal direction, locatable at a position outside from under said top plate in a direction along a shorter side of said top plate, and erectable in a vertical direction when said radiation image receiving portion locates at said outside position, wherein a direction of a longer side of said foil of said grid as compared to a direction of a longer side of said top plate when viewed in a direction along which x-rays are transmitted is maintained irrespective of said radiation image receiving portion being erected or not.

13. A radiographic stand with a radiation image receiving portion comprising:

a lying stand having a top plate on which a subject is supported;

a radiation image receiving portion including a grid comprising a plurality of stripes of foil arranged in a first direction; and a moving mechanism for making said radiation image receiving portion movable in a horizontal direction, locatable at a position outside from under said top plate in a direction along a shorter side of said top plate, and erectable in a vertical direction when said radiation image receiving portion locates at said outside position, wherein a direction of a longer side of said foil of said grid as compared to a direction of a longer side of said top plate is maintained irrespective of said radiation image receiving portion being erected or not.

14. A radiographic stand with a radiation image receiving portion comprising:

a lying stand having a top plate on which a subject is supported;

a radiation image receiving portion including a lengthwise side; and a moving mechanism for moving said radiation image receiving portion in a horizontal direction, locatable at a position outside from under said top plate in a direction along a shorter side of said top plate, and erectable in a vertical direction when said radiation image receiving portion locates at the outside position, wherein an orientation of said radiation image receiving portion with respect to said top plate is maintained irrespective of said radiation image receiving portion being erected or not.

* * * * *

UNITED STATES PATENT AND TRADEMARK OFFICE
CERTIFICATE OF CORRECTION

PATENT NO.   : 6,341,893 B1
DATED        : January 29, 2002
INVENTOR(S)  : Kazuhiro Matsumoto et al.

It is certified that error appears in the above-identified patent and that said Letters Patent is hereby corrected as shown below:

Column 4,
Line 57, "horizontally" should read -- vertically --.

Column 7,
Line 66, "in" should read -- in the direction of --.

Column 8,
Line 39, "stripes" should read -- strips --.

Column 9,
Line 32, "stripes" should read -- strips --.
Line 39, "locates" should read -- is located --.

Column 10,
Line 5, "portion" should read --portion, --.
Line 10, "stripes" should read -- strips --.
Line 17, "locates" should read -- is located --.
Line 35, "locates" should read -- is located --.

Signed and Sealed this

Ninth Day of July, 2002

Attest:

Attesting Officer

JAMES E. ROGAN
Director of the United States Patent and Trademark Office